Nov. 15, 1960  G. A. LYON  2,960,052
METHOD OF MAKING WHEEL TRIM
Filed Feb. 10, 1955  2 Sheets-Sheet 1
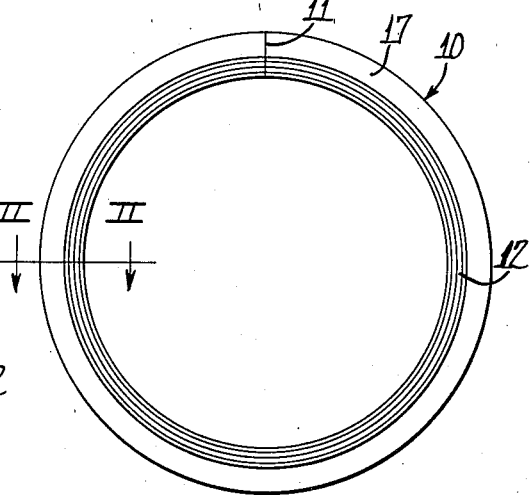
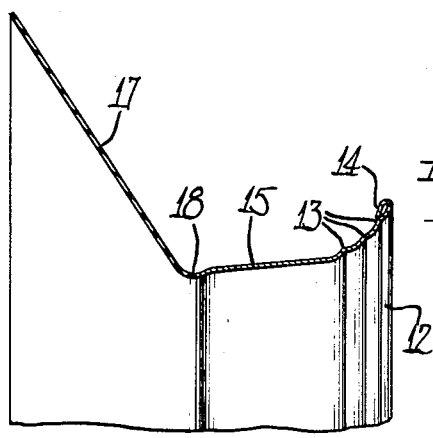
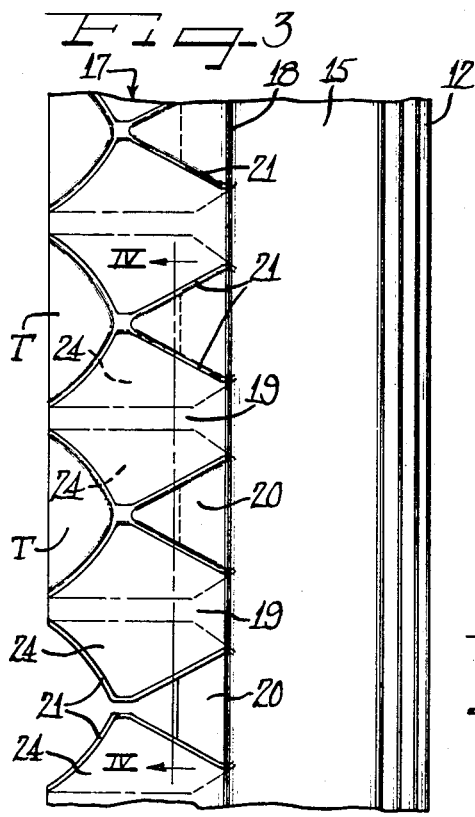
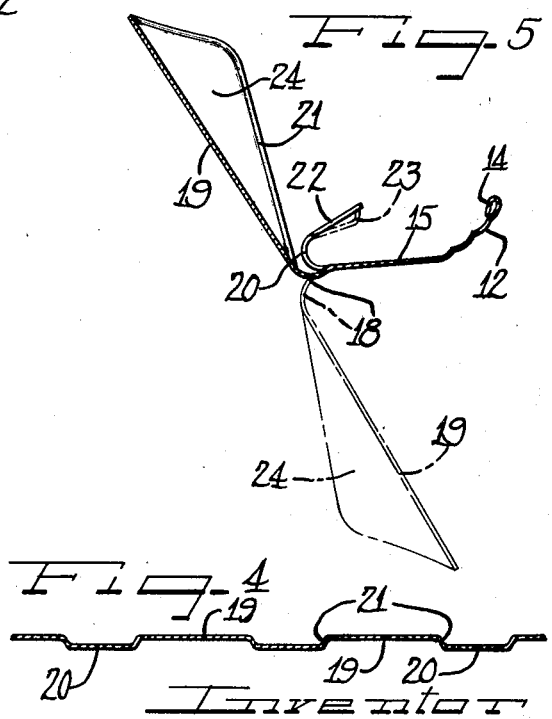
*George Albert Lyon*

Nov. 15, 1960 G. A. LYON 2,960,052
METHOD OF MAKING WHEEL TRIM
Filed Feb. 10, 1955 2 Sheets-Sheet 2
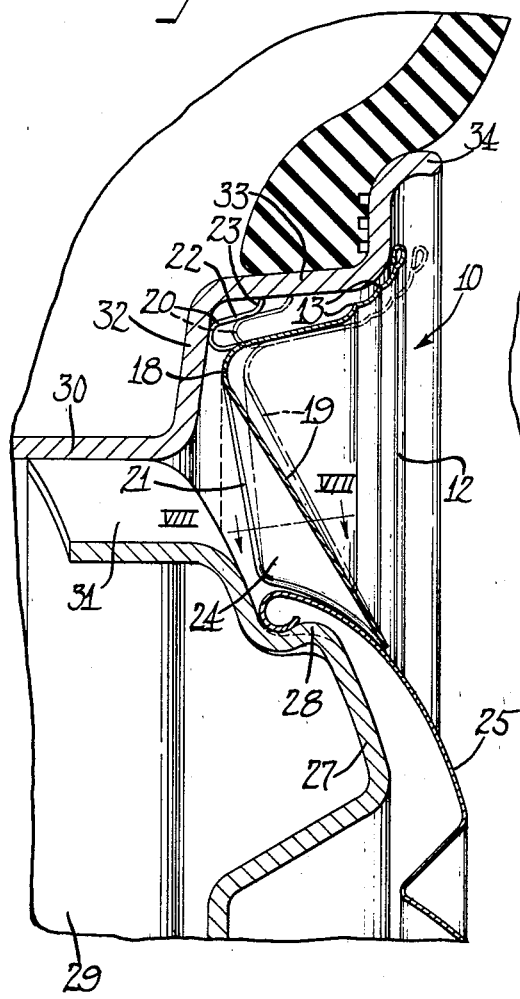
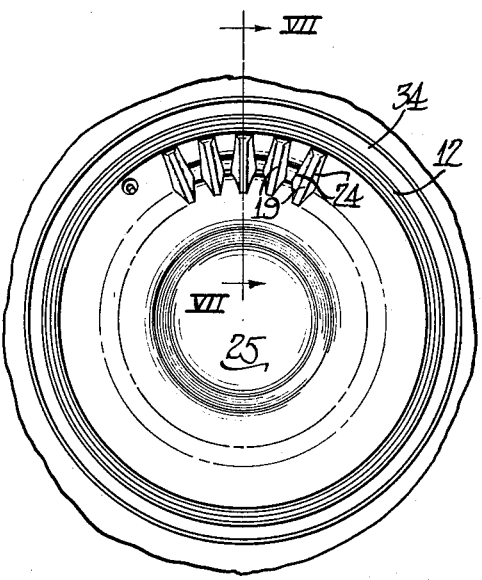
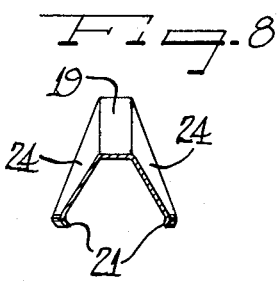
Inventor
George Albert Lyon
by Hill, Sherman, Meroni, Gross & Simpson
Attys 2,960,052
Patented Nov. 15, 1960

2,960,052
METHOD OF MAKING WHEEL TRIM

George Albert Lyon, 13881 W. Chicago Blvd., Detroit 28, Mich.

Filed Feb. 10, 1955, Ser. No. 487,361

5 Claims. (Cl. 113—116)

The present invention relates to improvements in making wheel trim, and more particularly trim for disposition at the outer side of vehicle wheels.

An important object of the present invention is to make wheel trim by rolling a preliminary section provided with a flange of substantial width adapted to be subdivided into spoke elements which require more material in their fabrication than would be available in a smaller diameter flange.

Another object of the invention is to provide a wheel trim with spoke elements having substantial angular flanges.

A further object of the invention resides in the economical, mass production of wheel trim having a novel arrangement of spoke elements.

Other objects, features and advantages of the present invention will be readily apparent from the following detailed description of a preferred embodiment thereof taken in conjunction with the accompanying drawings, in which:

Figure 1 is a plan view of a rolled ring blank for a wheel trim.

Figure 2 is an enlarged radial sectional view taken substantially on the line II—II of Fig. 1.

Figure 3 is a developed inside elevational view of the trim member of Fig. 2 following a stamping operation on the oblique flange thereof.

Figure 4 is a sectional detail view taken substantially on the line IV—IV of Fig. 3.

Figure 5 is a more or less schematic transverse sectional view through the trim member showing additional steps in the method of making the same.

Figure 6 is an outside elevational view of a wheel structure showing the trim member of the present invention in use thereon.

Figure 7 is an enlarged fragmentary radial sectional view taken substantially on the line VII—VII of Fig. 6, and Figure 8 is a sectional detail view taken substantially on the line VIII—VIII of Fig. 7.

According to the present invention a wheel trim is provided for disposition at the outer side of a vehicle wheel such as an automobile wheel. To this end, sheet metal in strip form, such as stainless steel, brass or the like, is rolled from a flat condition into cross sectional shape substantially as shown in Fig. 2 and to provide a continuous ring 10 joined at the ends of the strip, as indicated at 11, by welding or brazing or the like. In the preferred cross sectional shape, an outer annular body portion 12 is provided which is formed with a plurality of annular corrugations to define a plurality of axially inwardly extending reinforcing ribs 13 in the generally radially outwardly extending body. At its outer edge the body portion 12 may be turned under to provide a reinforcing and finishing bead 14. Extending axially inwardly from the body portion 12 is an annular flange 15 of substantial width joining a radially outwardly and axially inwardly oblique flange 17 of substantially greater width at a radially inwardly directed rib-like juncture 18 of substantial radius. The shape thus provided may be polished and plated to provide the same with a lustrous finish on all of the surfaces ultimately to be exposed at the outer side of the trim.

Then, the generally radially outwardly directed annular, oblique flange 17 is stamped to emboss the same with a pattern substantially as shown in Figs. 3 and 4 to provide alternate spoke element areas 19 and outwardly offset retaining finger areas 20 connected by offsetting bend flanges 21 and all connected integrally in one piece to the trim flange 15 at the juncture rib 18. It will be noted that the spoke areas 19 are of generally lanceolate shape, while the finger areas 20 are of generally triangular shape. At the same time, marginal trim-out areas T are offset outwardly between the spoke portions 19. The trim-out areas T are then trimmed away and the finger areas 20 are severed from the spoke areas 19, to leave the side flanges 21 on the spoke areas 19. Such trimming is exemplified in the lower portion of Fig. 3. It will be observed, also, that the adjacent contiguous side extremities of the spoke areas 19 are severed midway therebetween and the limited connecting area turned outwardly to form a continuation of the side flanges 21.

Thereafter, the severed finger areas which are preferably truncated to provide broad tips thereon, are turned outwardly to provide flexible leg portions 22 (Fig. 5) which are then, or in a subsequent operation further shaped to form at the extremities thereof generally radially outwardly directed stiff, short retaining terminals 23. Before or after turning of the retaining fingers 20, the flat spoke areas 19 are shaped by bending the upwardly flaring side portions thereof outwardly toward one another but to remain in a flaring or divergent relationship to provide side wing flanges 24. Thereby, the narrow edge flanges 21 are turned under to afford finishing and reinforcing flanges along the edges of the wings. Such formation of the wing flanges 24 along the dot dash lines shown in Fig. 3, may be accomplished before or after the spoke sections 19 are turned toward the inside of the ring as shown in dot dash position in Fig. 5. In such inward turning of the spoke sections 19 the rib portion 18 is worked to provide a dished radius juncture of substantial resilience.

By the method described, the side wing flanges 24 of the spoke elements 19 can be produced in substantially greater width than where the flange 17 is initially directed toward the inside of the ring since by having the flange 17 directed toward the outside of the ring a greater expanse of material is made available for deriving maximum width spoke areas therefrom. Then, as the spoke areas are bent toward the inside of the ring, the adjacent sides of the wing flanges 24 will approach close to each other.

The arrangement and construction of the trim ring 10 is such as to equip the same for disposition at the outer side of a vehicle wheel in association with a hub cap 25 (Figs. 6 and 7). The hub cap 25 is adapted to be applied to the outer side of a vehicle wheel body 27 having retaining bumps 28 thereon and provided with a marginal attachment flange 29 suitably secured to a base flange 30 of a tire rim and providing at suitable intervals wheel openings 31 at juncture with the tire rim. A side flange 32 extends from the outer margin of the base flange of the tire rim and merges with a generally axially and radially outwardly sloping intermediate flange 33 from which extends a terminal flange 34.

In assembling the trim member 10 with the outer side of the wheel, it is generally centered with respect to the wheel and the retaining fingers 20 placed in engagement with the intermediate flange 33 so that the retaining terminals thereof will cam inwardly to retaining engagement with the intermediate flange. As the trim member is pressed inwardly, the tip portions of the spoke members 19 engage against the outer side of the margin of the hub cap 25 and the spoke members are flexed into tensioned engagement with the hub cap by resilient deflectional yielding of the juncture portion 18 of the spoke members. Thereby the spoke members are held snugly against the hub cap against any possibility of rattling in service. As will be observed, the terminal portions of the wing flanges 24 generally conform to the overlying portion of the hub cap.

The structure of the wheel and trim 10 are covered in my copending application Serial No. 487,362, filed of even date herewith, now Patent No. 2,767,028, issued October 16, 1956.

It will be understood that modifications and variations may be effected without departing from the scope of the novel concepts of the present invention.

I claim as my invention:

1. In a method of making a wheel trim, shaping a ring of sheet metal into a generally tubular form with a narrow radially outwardly directed trim body portion at one end and a generally radially outwardly and axially oblique annular continuous flange of substantial width at the opposite end and affording a large area from which spoke elements of substantial width can be derived, shaping and severing said flange into a plurality of spoke elements having side wing flanges of substantial width and with the spoke elements joined to the ring, and bending said spoke elements inwardly toward the inner side of the ring to project generally radially inwardly with the side wing flanges in adjacent closer relation than in the oblique flange relationship.

2. In a method of making wheel trim, the steps of shaping a ring member with a generally radially outwardly and axially extending oblique annular flange affording a large area from which spoke sections of substantial width can be derived, embossing said flange to provide a plurality of contiguous spoke sections of generally lanceolate shape having side portions, severing said spoke sections from one another and bending the side portions thereof generally radially outwardly and thereby contracting the same to greater spacing relative to the side portions of the adjacent spoke sections, and finally bending said spoke sections toward the inner side of the ring to extend generally radially inwardly and into closer adjacent relationship due to the smaller diameter to which they extend at the inner side of the ring.

3. In a method of making wheel trim, shaping a ring of sheet metal to provide a generally axially extending flange and a generally radially outwardly and axially oblique annular flange of substantial width affording a large area from which spoke areas and finger areas can be derived, severing said oblique flange into alternate lanceolate spoke areas and generally triangular retaining finger areas, bending said retaining finger areas generally radially outwardly, and bending said spoke areas generally radially inwardly toward the inner side of the ring and thereby bringing the sides of the finger areas into closer lateral relationship to one another.

4. In a method of making wheel trim, shaping a sheet metal piece into a ring having a generally axially extending flange and a generally frusto-conical radially outwardly and axially extending oblique flange affording a large area from which finger and spoke areas can be derived, embossing said oblique flange to provide lanceolate spoke areas and intervening radially outwardly offset retaining finger areas connected at their sides by narrow offsetting flanges, severing the finger areas and spoke areas from one another but leaving the same attached to the axially extending flange and leaving the narrow offsetting flanges on the spoke areas, bending the finger areas outwardly to provide retaining fingers, bending the sides of the spoke areas generally toward one another with the narrow side flanges thereof underturned, and then bending the spoke areas toward the inner side of the ring with the side flanges directed in one general axial direction and substantially closer to one another than in the original position from which bent.

5. In a method of making wheel trim, rolling a strip of sheet metal into ring form with a generally axially extending annular intermediate flange having opposite marginal generally radially outwardly and axially directed flanges one of which is of substantially greater width than the other and is disposed at the ultimately axially inner end of the ring, joining the ends of the strip to complete the ring form, severing said wider flange into a plurality of generally lanceolate spoke areas connected on a generally radially inwardly directed rib juncture curvature with the axially extending flange, bending the sides of the spoke areas along longitudinal lines to provide side wing flanges diverging from a central portion of each of the spoke areas and thereby contracting the same to greater spacing relative to the sides of the adjacent spokes, then bending the spoke areas toward the inner side of the ring to thereby bring the side wing flanges into substantially closer relation to one another, and working the rib juncture into inwardly convex outwardly concave resilient connecting juncture about which the spoke members are resiliently flexible relative to said axial flange.

References Cited in the file of this patent

UNITED STATES PATENTS

| 2,214,319 | Bourdon | Sept. 10, 1940 |
| 2,368,229 | Lyon | Jan. 30, 1945 |
| 2,761,408 | Lyon | Sept. 4, 1956 |

FOREIGN PATENTS

| 750,254 | France | May 22, 1933 |
| 858,831 | France | Dec. 4, 1940 |